United States Patent
Zotov et al.

(10) Patent No.: US 8,004,503 B2
(45) Date of Patent: Aug. 23, 2011

(54) AUTO-CALIBRATION OF A TOUCH SCREEN

(75) Inventors: Alexander Zotov, Sammamish, WA (US); Reed Townsend, Seattle, WA (US); Sameer Shariff, Tinton Falls, NJ (US); Steve Dodge, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 11/358,816

(22) Filed: Feb. 21, 2006

(65) Prior Publication Data

US 2007/0195067 A1 Aug. 23, 2007

(51) Int. Cl.
*G06F 3/041* (2006.01)
(52) U.S. Cl. .................................. 345/178; 178/18.02
(58) Field of Classification Search .......... 345/173–179; 178/18.01–20.04
See application file for complete search history.

(56) References Cited

U.S. PATENT DOCUMENTS

| | | | |
|---|---|---|---|
| 4,638,119 A | 1/1987 | Blesser et al. | |
| 4,697,050 A | 9/1987 | Farel et al. | |
| 5,283,559 A | 2/1994 | Kalendra et al. | |
| 5,414,227 A | 5/1995 | Schubert et al. | |
| 5,491,706 A | 2/1996 | Tagawa et al. | |
| 5,751,276 A | 5/1998 | Shih | |
| 5,854,449 A | 12/1998 | Adkins | |
| 6,259,436 B1 * | 7/2001 | Moon et al. | 345/173 |
| 6,262,718 B1 * | 7/2001 | Findlay et al. | 345/178 |
| 6,456,952 B1 * | 9/2002 | Nathan | 702/94 |
| 6,583,676 B2 | 6/2003 | Krah et al. | |
| 6,727,896 B2 | 4/2004 | Tsang | |
| 6,809,726 B2 | 10/2004 | Kavanagh | |
| 7,190,351 B1 * | 3/2007 | Goren | 345/173 |
| 2003/0169239 A1 | 9/2003 | Nakano et al. | |
| 2005/0093831 A1 | 5/2005 | Wang | |
| 2006/0007182 A1 * | 1/2006 | Sato et al. | 345/173 |

OTHER PUBLICATIONS

Wacom Company Ltd., "Wacom Graphire 3 Studio XL" [online] 2006 Wacom Europe GmbH [retrieved on Feb. 2, 2006] Retrieved from the Internet: <URL: http://www.wacom-europe.com/int/products/graphire/product.asp?lang=en&type=14>.

Microsoft Windows XP, "Windows XP Tablet PC Edition 2005 Features" [online] Aug. 25, 2004 [retrieved on Feb. 2, 2006] Retrieved from the Internet: <URL: http://ww.microsoft.com/windowsxp/tabletpc/evaluation/features.mspx?pf=true>.

Ted Anthony, GlobeAndMail.com, "ThinkPad Tablet Gets It Right" [online] Jul. 29, 2005 [retrieved on Feb. 2, 2006] Associated Press, Copyright 2006 Bell Globemedia Publishing Inc. Retrieved from the Internet: <URL: http://www.globetechnology.com/servlet/story/RTGAM.20050729.gtpadd0729/BNStory/TechReviews/>.

(Continued)

*Primary Examiner* — Kevin M Nguyen
*Assistant Examiner* — Stephen A Bray
(74) *Attorney, Agent, or Firm* — Lee & Hayes, PLLC

(57) ABSTRACT

Methods and systems are provided for automatically calibrating a pointing device, such as a stylus, with a writing surface, such as a touch screen. In one example, an automated method is implemented to calibrate the writing surface based user inputs attempting to use the computer for functions other than calibration of the writing surface. The user inputs may be, for example, a user selecting a button within a non-calibration software application. The automated method may generate a miscalibration vector based upon where the user input was received and where the user input was expected. In yet another example, a bias field may be generated for the writing surface from the collected user inputs. In yet other examples, a computing device may comprise computer-executable instructions for performing one or methods of calibrating the writing surface.

18 Claims, 5 Drawing Sheets

OTHER PUBLICATIONS

NEC Solutions (America), Inc., "NEC Versa LitePad Tablet PC Digital Pen Set" [online] Feb. 2003 [retrieved on Feb. 2, 2006] Retrieved from the Internet: <URL: http://support.necsam.com/mobilesolutions/hardware/TabletPCs/litepad/819-201012-000med.pdf>.

* cited by examiner

AUTO-CALIBRATION OF A TOUCH SCREEN

BACKGROUND

Computers accept human user input in various ways. One of the most common input devices is the keyboard. Additional types of input mechanisms include mice and other pointing devices. Although useful for many purposes, keyboards and mice (as well as other pointing devices) sometimes lack flexibility. For example, many persons find it easier to write, take notes, etc. with a pen and paper instead of a keyboard. Mice and other types of pointing devices do not generally provide a true substitute for pen and paper.

Electronic tablets or other types of electronic writing devices offer an attractive alternative to keyboards and mice. These devices typically include a stylus with which a user can write upon a display screen in a manner similar to using a pen and paper. In some embodiments, a digitizer nested within the display converts movement of the stylus across the display into an "electronic ink" representation of the user's writing. The electronic ink is stored as coordinate values for a collection of points along the line(s) drawn by the user. Software may then be used to analyze the electronic ink to recognize shapes, gestures, characters, or sequences or characters such as words, sentences, paragraphs. In many cases, the recognized shapes may be converted to Unicode, ASCII or other code values for what the user has written. In other instances, a stylus may be used to "select" or otherwise interact with buttons or other graphical representations on the writing device. Increasingly, such touchscreen displays have been widely used in computer terminal applications, such as with portable and hand-held computers and with informational and point-of-purchase terminals, eliminating the need for less portable input devices, such as keyboards.

Generally, these touchscreen displays comprise a touch-sensitive or electromagnetic panel, which reports the two-dimensional touchpoint location (that is, the X axis and the Y axis) at which it has been touched, coupled to a display, which may show icons or buttons to be "selected" for data entry. However, proper operation of the touchscreen display requires calibration of the panel coordinates to corresponding points on the display.

Proper calibration is necessary in order to reliably determine the precise coordinates of the point at which the screen is touched or otherwise activated. In most cases, icons or symbols on the touchscreen display are sized and spaced according to the relative size of the touching member (typically, either a finger or a stylus), allowing some tolerance for error. However, there can be instances where it is important that X-Y coordinates of a touch location be very closely pinpointed. Moreover, there can be instances where poor calibration can lead to inaccurate data entry or can cause a customer or employee to be misunderstood or frustrated by what seems to be incorrect or unintended response to a screen entry.

Most current calibration techniques prompt a user to touch two or more reference points on the touchscreen. These points are then used to calibrate the coordinates of the panel to its underlying display. The actual coordinates at which the user touches the screen for calibration provides one or more "touchpoints" that serve as reference points for this positional calibration. The system stores these calibration touchpoints and performs any necessary scaling and coordinate adjustment based on these touchpoints. Unfortunately, these programs often require the user to stop performing their tasks and undergo the calibration procedure. Moreover, switching users may require further calibration of the writing surface.

For example, in some styluses, the emitting EM field that registered the "touching" with the writing surface is located not in the pen tip that makes contact with the writing surface, but located up to an inch away (e.g. inside the shaft of the stylus). As a result, if pen is held at an angle (which is often the case), the X and Y coordinates reported will be off. This is known as parallax caused by pen tilt. Different users may hold the stylus at differing angles, thus requiring the writing surface to be recalibrated each time a different user uses the computing device. Moreover, modifications in one or more configuration parameters may cause systematic disturbances in the EM field, such as the power source of the computer and the usage of drives.

Over time, the user may tire of continually calibrating the writing surface, thereby reducing the desirability of using such a display device. What is needed, therefore, are automated methods and systems of calibrating a pointing device respective to the writing surface during operation of the writing surface that does not require the user to perform a separate calibration process.

SUMMARY

Methods and systems are provided for calibrating a pointing device, such as a stylus, with a writing surface, such as a touch screen. In one example, an automated method is implemented to calibrate the writing surface based on one or more user inputs attempting to use the computer for functions other than calibration. The user inputs may be, for example, a user selecting a button within a non-calibration software application. For example, the application may be any arbitrary program having functions other than calibration of the touchscreen. The automated method may generate a miscalibration vector based upon where the user input was received and where the user input was expected. The miscalibration vector may be used to recalibrate the writing surface on one or more axes. In yet another example, the method may be initiated upon detecting a modification in the computer's configuration, such as a change in the power source.

In yet another example, a bias field may be generated for the writing surface. In one such example, a weighted sum of the bias vectors may be calculated. In yet other examples, a computing device may comprise computer-executable instructions for performing one or methods of calibrating the writing surface.

These and other advantages will become apparent from the following detailed description when taken in conjunction with the drawings. A more complete understanding of the present invention and the advantages thereof may be acquired by referring to the following description in consideration of the accompanying drawings, in which like reference numbers indicate like features. The invention is being described in terms of exemplary embodiments. Numerous other embodiments, modifications and variations within the scope and spirit of the appended claims will occur to persons of ordinary skill in the art from a review of this disclosure.

DETAILED DESCRIPTION

Exemplary Operating Environment

Figure 1:
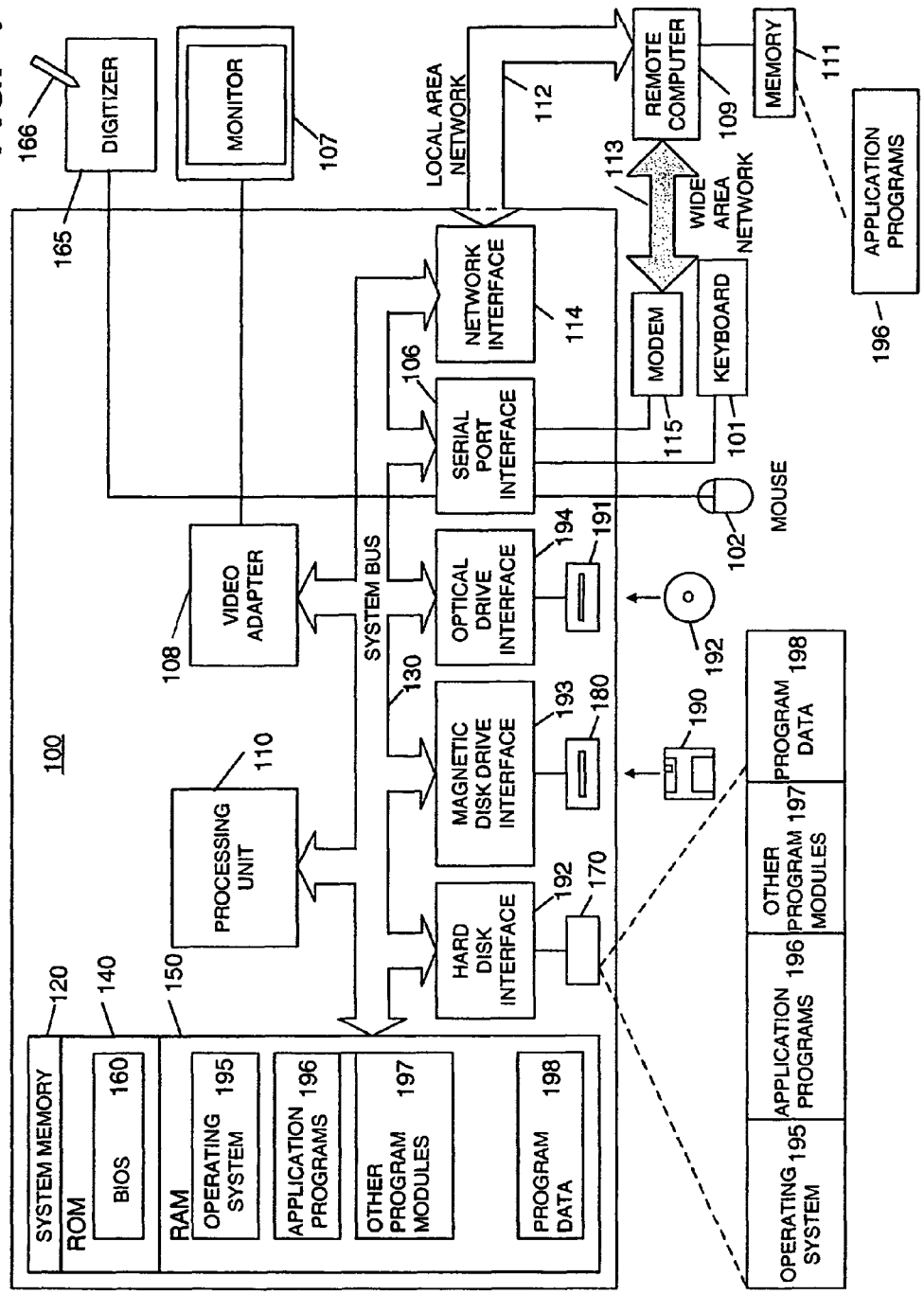
FIG. 1 illustrates an exemplary computer system in which embodiments of the invention may be implemented.

FIG. 1 illustrates a functional block diagram of an exemplary conventional general-purpose digital computing environment that can be used to implement various aspects of the invention. The invention may also be implemented in other versions of computer 100, for example without limitation, a hand-held computing device or a tablet-and-stylus computer. The invention may also be implemented in connection with a multiprocessor system, a microprocessor-based or programmable consumer electronic device, a network PC, a minicomputer, a mainframe computer, hand-held devices, and the like.

Computer 100 includes a processing unit 110, a system memory 120, and a system bus 130 that couples various system components including the system memory to the processing unit 110. The system bus 130 may be any of various types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), which is stored in the ROM 140, contains the basic routines that help to transfer information between elements within the computer 100, such as during start-up. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 182 such as a CD ROM, DVD or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for computer 100. Other types of computer readable media may also be used.

A number of program modules can be stored on the hard disk drive 170, magnetic disk 190, optical disk 182, ROM 140 or RAM 150, including an operating system 195, one or more application programs 196, other program modules 197, and program data 198. A user can enter commands and information into the computer 100 through input devices such as a keyboard 101 and/or a pointing device 102. These and other input devices are often connected to the processing unit 110 through a serial port interface 106 that is coupled to the system bus, but may be connected by other interfaces, such as a parallel port, game port, a universal serial bus (USB) or a BLUETOOTH interface. Further still, these devices may be coupled directly to the system bus 130 via an appropriate interface (not shown). A monitor 107 or other type of display device is also connected to the system bus 130 via an interface, such as a video adapter 108.

In one embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

Figure 2:
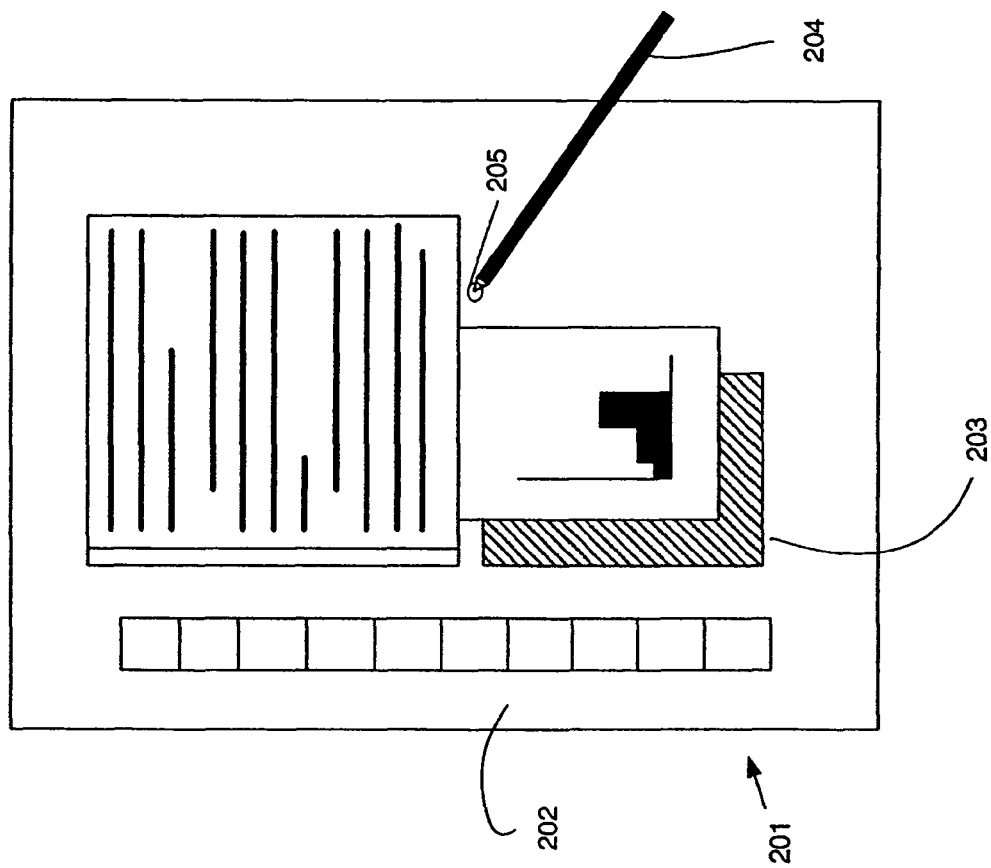
FIG. 2 illustrates an example of a hand-held device or tablet-and-stylus computer that can be used in accordance with various aspects of the invention.

FIG. 2 illustrates an example of a hand-held device or tablet-and-stylus computer 201 that can be used in accordance with various aspects of the invention. Any or all of the features, subsystems, and functions in the system of FIG. 1 can be included in the computer of FIG. 2. Hand-held device or tablet-and-stylus computer 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Hand-held device or tablet-and-stylus computer 201 interprets gestures made using stylus 204 in order to manipulate data, enter text, create drawings, and/or execute conventional computer application tasks such as spreadsheets, word processing programs, and the like. For example, a window 203a allows a user to create electronic ink 206 using stylus 204.

The stylus 204 may be equipped with one or more buttons or other features to augment its selection capabilities. In one embodiment, the stylus 204 could be implemented as a "pencil" or "pen," in which one end constitutes a writing portion and the other end constitutes an "eraser" end, and which, when moved across the display, indicates to interested software that portions of the display are to be erased. Other types of input devices, such as a mouse, trackball, or the like could be used. Additionally, a user's finger could be the stylus 204 and used for selecting or indicating portions of the displayed image on a touch-sensitive or proximity-sensitive display. Region 205 shows a feedback region or contact region permitting the user to determine where the stylus 204 has contacted the display surface 202.

Description of Illustrative Embodiments

Figure 3:
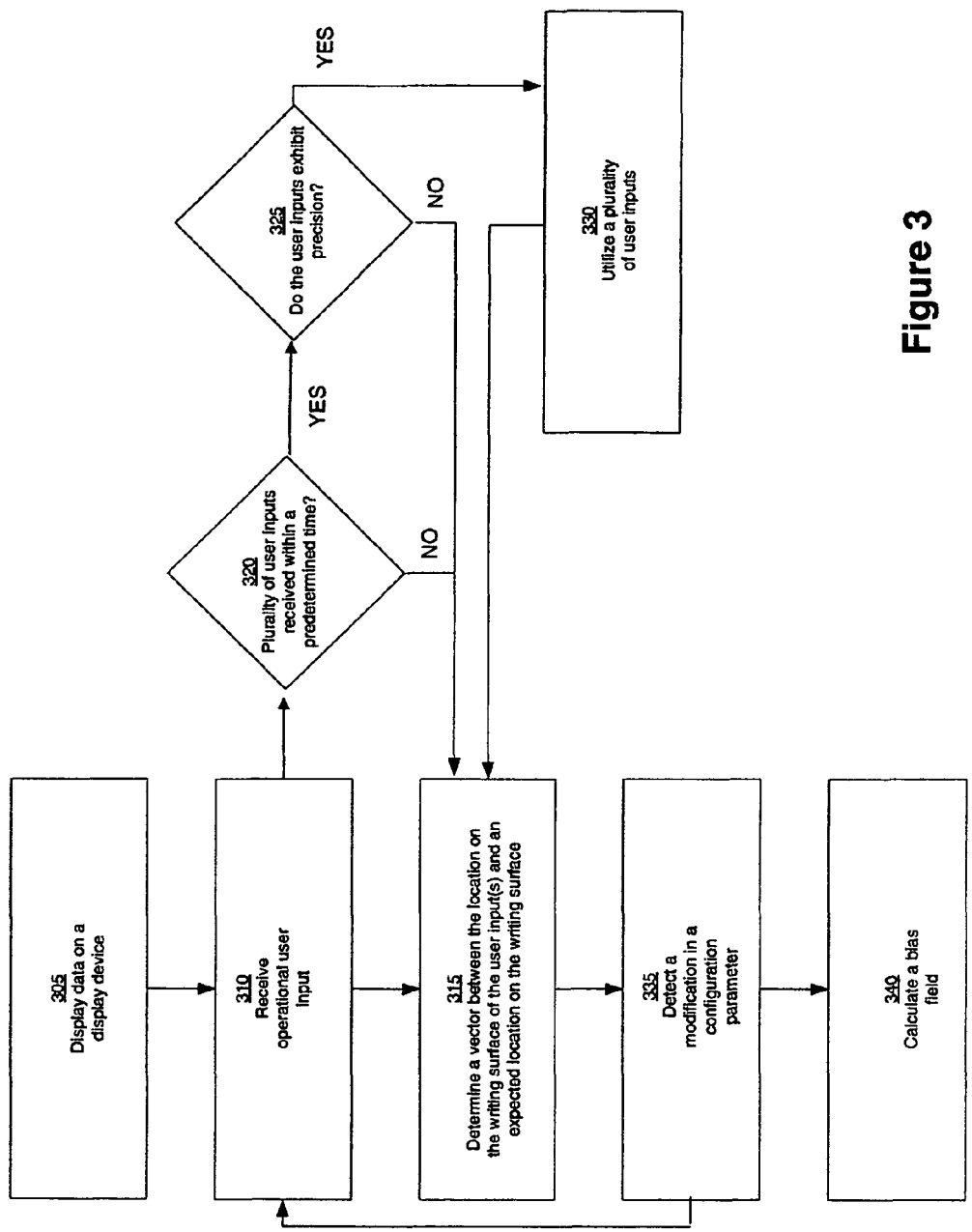
FIG. 3 is a flow diagram of an exemplary method of calibrating a pointing device respective to a writing surface according to one embodiment of the invention.

FIG. 3 is an illustrative method of calibrating a point device, such as a stylus 204, respective to a writing surface, such as display surface 202. The process may initiate for example, upon start up of the computing device, upon the passing of a predetermined period of time, or upon the occurrence of a specific event. In step 305, data may be displayed to one or more users through a writing surface. The data may comprise text, graphics, or a combination thereof. In one embodiment, the data is a graphical user interface (GUI), employing one or more applications, such as Microsoft® Windows® operating system. As one skilled in the art readily appreciates, GUIs may comprise a plurality of graphical representations a user may interact with. Microsoft® Windows® operating system, for example, comprises a GUI that includes buttons, tabs, toggle switches, windows that may be adjusted, such as resized, opened or closed, and a plurality of other mechanism for users to interact with the computing device. It is to be understood that operating systems are not the only application that may be utilized according to the many aspects of the invention. Indeed, the application may be software or hardware-based. In one embodiment, a plurality of applications may be concurrently displayed on a single display surface, such as display surface 202, wherein a user may provide a user input, such as the input of step 310 (described below) to one or more applications.

In step 310, an operational user input is received at the computing device displaying the data of step 305. As used herein, the term operational user input relates to any user input from one or more input devices that is received to perform an intended function other than exclusively for calibration of the writing surface. Exemplary operational user inputs may include, but are not limited to, attempts from the user to click a button, resize, move or close a window, select a hyperlink or predetermined area of the display surface, toggle a switch, or otherwise interact with the writing surface. While the user input may be utilized for calibrating the writing surface, it is not received from the user for calibrating the writing surface.

Figure 4:
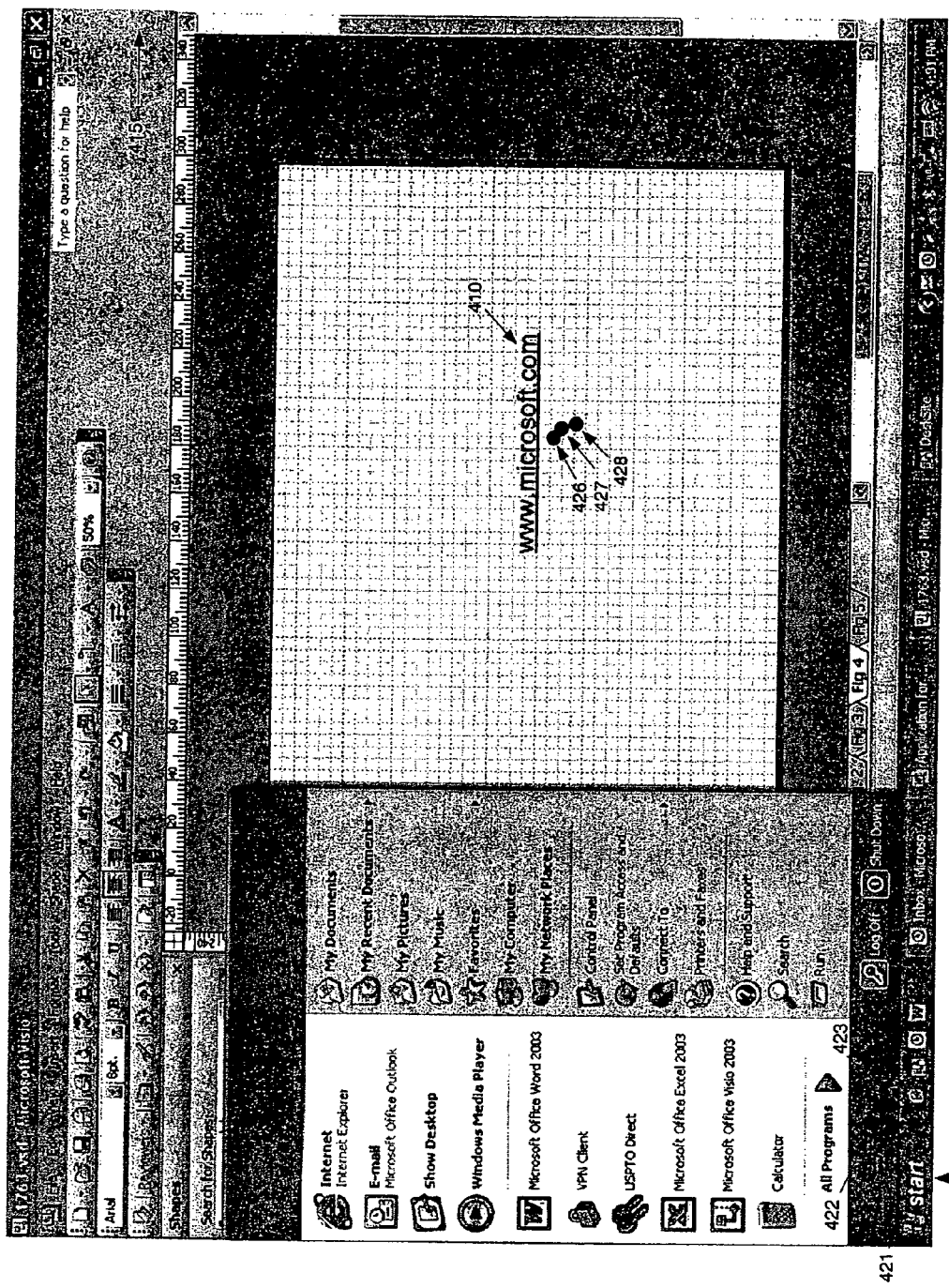
FIG. 4 shows an exemplary screen shot of data being displayed on a display device having a writing surface disposed thereon.

FIG. 4 shows an exemplary screen shot of data being displayed on a display device having a writing surface disposed thereon. In the exemplary screen shot, the data comprises, inter alia, a button 405, a hyperlink 410, and an adjustable window 415. Looking to FIG. 4, there are also exemplary groups of operational user inputs such as inputs 421, 422, and 423 (shown in close proximity to button 405) and inputs 426, 427, and 428 (shown in close proximity to hyperlink 410). The user inputs are shown merely for illustrative purpose to demonstrate the location on the writing surface that the operational user input was received. One skilled in the art will realize there may not be an actual graphical representation displayed on a display device to show the location of the operational user inputs, rather the inputs are shown for illustrative purposes to convey aspects of the invention.

In step 315, a miscalibration vector between the location on the writing surface of one or more operational user inputs and at least one expected location on the writing surface for the one or more operational user inputs is determined. As one skilled in the art understands, there are a plurality of mechanisms available to determine the expected location of a user input.

In one embodiment, proximity to a user selectable element, such as a button, tab or window, may determine the intended or expected location of the operational user input(s). As seen in FIG. 4, operational user input 421 is located in close proximity to button 405. A "cut-off" value for determining a proximate user selectable input may be utilized. For example, a distance of 2 mm may be considered too distant to be considered the expected location. In yet another embodiment, the type of user selectable element may determine the "cut-off" value. For example, a large button, such as button 405 may have a cut-off distance of 20 pixels, while a textual hyperlink may have a lesser cut-off value, for example, 0.5 mm. Therefore, in one embodiment of the invention, button 405 may be determined to be the expected or intended location of user input 421 if the user input is within the cut-off value. As one skilled in the art will realize, the cut-off distance may vary between the x-axis and the y-axis, for example, the user-selectable element is not square in shape, or proximity to other user-selectable elements. Generally, the cut-off distance is derived from what is "comfortably easy" to the target using a stylus or finger.

In those embodiments utilizing distance measurement, such as millimeters, the distance may readily be translated into pixels for one or more display devices by querying display characteristics from the display device(s). Moreover, one skilled in the art will realize other units may be used to determine an expected location of a user input.

In yet another embodiment, the manner in which a particular user-selectable element may be selected by one or more users is considered when determining the intended or expected location of a received operational user input. This is especially useful when the user input(s) received in step 305 is in close proximity to a plurality of user-selectable elements. For example, in one embodiment, button 405 may only be selected or otherwise activated by receiving a signal indicated the user had "double tapped", yet other elements, such as window 415, are resized by users providing a "dragging" user input.

Figure 5:
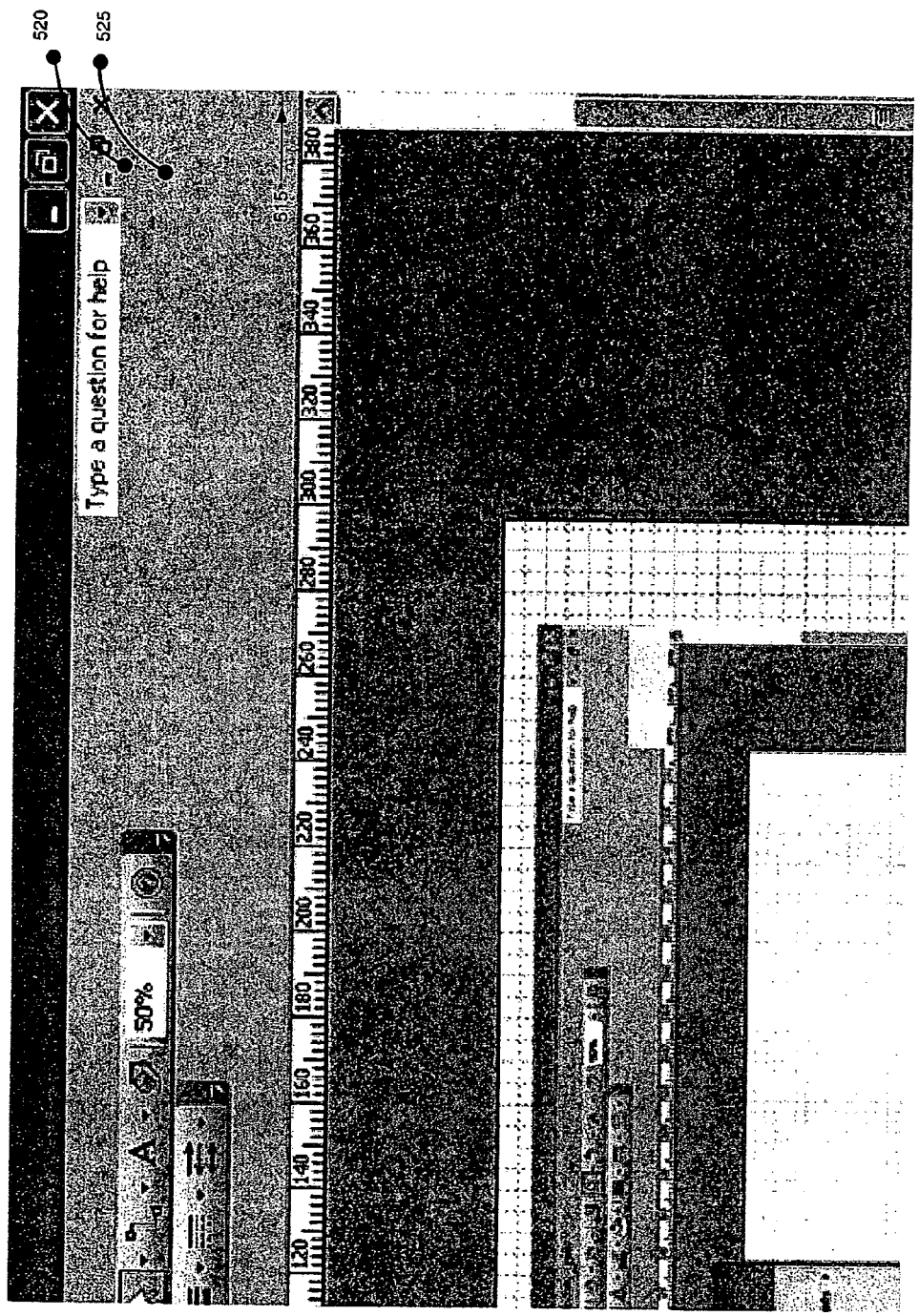
FIG. 5 shows another exemplary screen shot of data being displayed on a display device having a writing surface disposed thereon.

FIG. 5 shows an exemplary screen shot of graphical data being displayed on a display device having a writing surface. Window 515, which may be similar to window 415, is capable of being manipulated, such as being resized. Note, however, that window 515 is in close proximity to a plurality of buttons, text fields, and other user-selectable elements displayed on the display device. As seen in the figure, operational user inputs 520 and 550 have been received from a user and generally indicate a "dragging" motion, as the inputs begin with a starting point and proceed to the left to terminate in a ending point. Utilizing proximity alone, it would be difficult to determine intended location of the inputs. Therefore, the type of user input received, alone or in conjunction with other factors, such as proximity, may aid in the determination of the expected or intended location 410. For example, if a "dragging input" is received in close proximity to a button and a resizable window, it may be determined to be more likely to be intended to resize the window than to push the button. In this case, it may be readily determined that operational user inputs 520, 525 were intended to resize window 515.

In many instances, the intended location(s) of the operational input(s) is readily determinable. For example, computer-executable instructions may "inspect" the type of object being dragged in a "dragging input" to determine whether the target location is the likely location. For example, text is often dragged to a text area while icons representing files are often dragged to file areas, for example, into a window of Windows® Explorer®.

In yet another embodiment, a plurality or user inputs, whether "double taps" or "dragging", may be required to be considered operational user inputs. This would be especially advantageous where a single stray user input may erroneously be utilized as an operational user input. In one embodiment, optional step 320 may be utilized to determine if a plurality of user inputs have been received within a certain frame, such as for example, 5 seconds. In one such embodiment, only those inputs received within a predetermined period of time will be utilized. In yet a further embodiment, optional step 325 may be utilized in conjunction with or independent of step 320 to determine if a series of user inputs exhibit a level of precision to be considered operational user inputs where the user is attempting to interact with a particular user-selectable element. While the miscalibration of the writing surface causes the accuracy to be off, the precision of a plurality of user inputs is likely to suggest the user intended to interact with the same user-selectable element. For example, a level of precision, such as a distance of 1 mm between each input may have to be received before any of the user input may be considered for calibration. In such an embodiment, step 330 may be implemented to use that portion of the user inputs for calibration. Of course, the precision required for each type, class, or independent user-selectable element may vary in different embodiments of the invention. As discussed above, activation or button 405, hyperlink 410, and/or resizing of the window 415 performs a function other than calibration of the writing surface.

The calculation of the miscalibration vector may be performed through any number of mechanisms known to those skilled in the art. In one embodiment, a simple vector from the actual location of the user input to the expected or intended location is constructed on one or more axis (such as the x-axis representing the horizontal miscalibration and the y-axis representing the vertical miscalibration). Looking to FIG. 3, non-calibration user input 421 may be estimated to be approximately +3 units miscalibrated in the x axis and approximately +4y units miscalibrated in the y axis. In one embodiment, these measurements will be used to construct a miscalibration vector for that particular location of the writing surface. In yet another embodiment, the averages of a plurality of operational user inputs may be used, such as user inputs 421, 422, and 423 to determine the bias vector for that particular location (see, e.g., steps 320/325).

While some buttons, such as button 405 may provide a bias vector having x and y coordinates, other user selectable elements provide more precise bias vectors on a single axis than may be obtainable with other elements. For example, hyperlinks, such as hyperlink 410, are arranged in a horizontal fashion and generally have a minor fluctuation on the vertical (y) axis. Therefore, hyperlinks may provide an excellent choice for determining the vertical miscalibration of the writing surface. For example, while operational user inputs 426, 427, and 428 may have a horizontal and a vertical coordinates, in at least one embodiment, only the vertical coordinate(s) may be used when constructing a miscalibration vector.

While the illustrated hyperlink is shown as a mechanism for calibrating only the vertical axis, one skilled in the art will readily understand that any user-selectable element, including hyperlinks may also be utilized when determining vectors.

As one skilled in the art will readily appreciate EM fields, whether from the computing device or an external source may cause miscalibration of the writing surface. The miscalibration may be permanent or temporary while the disturbing EM field is proximate to the computing device. Indeed, modifications in the configuration of the computer itself may warrant calibration. In optional step 335, one or more modifications in a configuration parameter of the computing device are detected. Possible configuration modifications may include, but are not limited to changes in power sources, utilization of a hard drive, processors, and the location of the computing device. For example, it is known in the art that upon changing a computing device from direct current (DC) power to alternating current (AC) power, different electromagnetic fields may be produced on portions of the writing surface. Likewise, the location of a battery or power source may change the calibration. Similarly, the use of a hard-disk drive utilizing movable parts, such as spinning disks, will create an EM field when the disk is spinning, thus possibly altering the calibration of the writing surface. As one skilled in the art will understand, the location of the disk drive may cause different portions of the writing surface to have different miscalibration vectors. A solution to this problem is discussed in more detail below when describing a bias field.

The computing environment itself may cause different EM fields. For example, a user who utilizes the computer at home may have different miscalibration vectors when the computer is used in his/her office. Therefore, upon detecting the computing device has switched to a new location, such as by detection of a new network, a modification of a configuration parameter is determined to have occurred. Likewise, different users may hold the pointing device or stylus in a different manner, so switching users may be determined to be a modification in the configuration parameters. Indeed, any alteration in the computing environment or computing device may alter the EM field on any portion of the writing surface may be considered a modification in a configuration parameter.

In one embodiment, upon detecting one or more modifications of a configuration parameter have occurred, step 310 may be reinitiated or otherwise increased to capture more operational user inputs. In yet another embodiment, one or more schemes may be set up that automatically "adjust" the calibration of the writing surface upon specific modifications occurring, wherein the adjustment is determined by a plurality of operational user inputs previously collected.

As alluded to above, EM fields from both endogenous (i.e., a spinning hard drive) and extraneous sources (i.e., environmental interference), alter different portions of the screen in a manner that may exhibit different levels of miscalibration. This problem is further exacerbated if the collected operational user inputs (for example, collected in step 305) are sparsely distributed throughout the writing surface. In such instances, step 340 may be initiated to calculate a bias field for the writing surface. In one embodiment, step 340 interpolates bias values for a given point on the writing surface based on the vectors of step 315. As one skilled in the art will understand, there are many possibilities for interpolation methods.

In one interpolation method, for each pixel on the screen, a weighted sum of all the vectors collected is computed. In one embodiment, the weight of each vector is $1/R^2$, where R is the distance to the beginning point of that particular vector. The weighted sum may then be divided by a normalizing coefficient, such as for example, the sum of all the different weights. The inventors have found the above and similar approaches to work exceptionally well for their purposes as the result is a weighted average vector where the importance of all adjacent vectors drops off with $R^2$. The $1/R^2$ function is aggressively decaying, thus causing vectors close by to strongly dominate the weighted average. Additionally, using a weighted average scheme allows two vectors that approximately equally close to a point to have approximately equal effect on the resulting vector, as opposed to just using the closest vector as the bias which would cause a vector just a little bit further than the closest to carry no weight at all. In other embodiments, a weighted average vector where the weight is an exponential decay or some other aggressively decaying function could also work quite well.

As readily appreciated by one skilled in the art, the bias field may be routinely updated as new operational user inputs are received in step 305. Moreover, as discussed above, modifications of configuration parameters may require the need for recalculation or adjustment of the bias field. The processes described above may occur without the user's knowledge, therefore the calibration may seem seamless and effortless to the user.

The present invention has been described in terms of exemplary embodiments. Numerous other embodiments, modifications and variations within the scope and spirit of the appended claims will occur to persons of ordinary skill in the art from a review of this disclosure. For example, one skilled in the art will appreciate different methods may be used to calculate the miscalibration vectors and bias field without departing from the scope of the invention.

We claim:

1. A computer-implemented method of automatically calibrating a writing surface respective to a pointing device during normal operation of the writing surface, the method comprising:

displaying data on a display device having a writing surface thereon, the display device being in operative communication with a computing device;

receiving at least one operational user input on at least one actual location on or proximate to a user-selectable element of a graphical user interface upon the writing surface during usage of the computing device, wherein the user input is indicative of attempting at least one function other than calibration, the function related to the user-selectable element;

determining a type of input from among recognized user input types including a single tap motion, a double tap motion, and a dragging motion for each operational user input;

determining an expected location on the writing surface for each operational user input;

determining a miscalibration vector between the location on the writing surface of the at least one user input and at least one expected location on the writing surface of the at least one user input;

recalibrating the writing surface with respect to at least one axis to interpret subsequent operational user input;

detecting a modification in a configuration parameter of the computing device, wherein the configuration parameter is related to a configuration of hardware components of the computing device relative to one another and the modification comprising changing the computing device from a direct current (DC) power to alternating current (AC) power, changing a location of a battery or power source, or changing a use of a hard-disk drive; and executing a scheme to automatically adjust the calibration of the writing surface, wherein the adjustment is determined by the plurality of operational user inputs previously received prior to the modification.

2. The computer-implemented method of claim 1, wherein the user-selectable element is selected from the group consisting of a button, hyperlink, task bar, edges of a boundary, and combinations thereof.

3. The computer-implemented method of claim 1, wherein the expected location of the at least one operational user input is determined according to the proximity of the actual location of the at least one operational user input relative to a user-selectable element.

4. The computer-implemented method of claim 1, wherein the expected location of the at least one operational user input is determined according to the type of actual operational user input received upon the writing surface.

5. The computer-implemented method of claim 1, wherein the at least one expected location on the writing surface comprises a plurality of locations located on different portions of the writing surface.

6. The computer-implemented method of claim 5, the method further comprising:

calculating a bias field for the writing surface of the display device, the calculating comprising:

for a given location proximate to an expected location on the writing surface, calculating a weighted sum of bias vectors; and dividing the weighted sum by a normalizing coefficient being the sum of all the weights to obtain a weighted average vector.

7. The method of claim 6, wherein the weighted sum of the bias vector is weighted by $1/R^2$, where R is the distance from the given location on the writing surface to a starting position of a particular vector.

8. The computer-implemented method of claim 1, wherein proximity to a user-selectable element of a graphical user interface is determined by calculating whether a corresponding operational user input is within a cut-off distance value where the cut-off distance value depends upon an acceptable type of input associated with the corresponding user-selectable element.

9. The computer-implemented method of claim 8, wherein the cut-off distance value varies between an x-axis and a y-axis.

10. The computer-implemented method of claim 1, wherein determining a particular expected location corresponding to a particular operational user input includes determining a type of user-selectable element based on the type of input received, and wherein the type of user-selectable element influences a corresponding expected location.

11. The computer-implemented method of claim 1, wherein determining a type of input for each operational user input includes determining a number of operational user inputs received within a predetermined time.

12. The computer-implemented method of claim 11, wherein determining the type of input includes, for a plurality of received user inputs, determining whether each subsequent user input is within a level of precision distance from a previous user input.

13. A computer device comprising a processor, a display device having a writing surface thereon, and a computer-readable storage medium, wherein the computer-readable storage medium has computer-executable instructions for performing acts comprising:

displaying an output on the display device, wherein the output comprises a graphical representation of at least one aspect of a non-calibration application;

detecting an operational user input on the writing surface of the display device, the input attempting to select at least one graphical representation of the at least one non-calibration application displayed on the display device;

determining a type of input from among recognized user input types including a single tap motion, a double tap motion, and a dragging motion for the operational user input;

determining an expected location on the writing surface for the operational user input;

determining a bias vector between the location on the writing surface of the user input and the expected location on the writing surface of the user input;

recalibrating the writing surface with respect to at least one axis;

detecting a modification in a configuration parameter of the computing device, wherein the configuration parameter is related to a configuration of hardware components of the computing device relative to one another and the modification comprising changing the computing device from a direct current (DC) power to alternating current (AC) power, changing a location of a battery or power source, or changing a use of a hard-disk drive; and executing a scheme to automatically adjust the calibration of the writing surface, wherein the adjustment is determined by the plurality of operational user inputs previously received prior to the modification.

14. The computer-implemented method of claim 13, wherein the at least one expected location on the writing surface is a user-selectable element of a graphical user interface selected from the group consisting of a button, hyperlink, task bar, edges of a boundary, and combinations thereof.

15. The computer-implemented method of claim 13, wherein the expected location of the at least one operational user input is determined by the criteria comprising the proximity of the actual location of the at least one operational user input relative to a user-selectable element, the type of actual non-calibration user input received upon the writing surface.

16. The computer-implemented method of claim 13, the method further comprising:

calculating a bias field for the writing surface of the display device comprising:

(1) for a given location on the writing surface, calculating a weighted sum of bias vectors; and (2) dividing the weighted sum by a normalizing coefficient being the sum of all the weights to obtain a weighted average vector.

17. The computer-implemented method of claim 16, wherein the weighted sum of the bias vector is weighted by $1/R^2$, where R is the distance from the given location on the writing surface to a starting position of a particular vector.

18. The computer device of claim 13, wherein determining the bias vector between the location on the writing surface of the user input and the expected location on the writing surface of the user input commences after a predetermined delay or after a specific event related to a change in the hardware components of the computer device or the computer device changing its location in a network.

* * * * *